United States Patent Office 2,957,744
Patented Oct. 25, 1960

2,957,744

SILICON-CONTAINING ICE COLORS

Donald L. Bailey, Snyder, and Ronald M. Pike, Grand Island, N.Y., assignors to Union Carbide Corporation, a corporation of New York No Drawing. Filed Apr. 29, 1957, Ser. No. 655,504

2 Claims. (Cl. 8—8)

This invention relates to silicon-containing azoic dyestuffs as new compositions of matter, and to processes for their production.

The silicon-containing azoic dyestuffs of the present invention contain the unit represented by the general formula: $-N=N-Ar-C_aH_{2a}-Si\equiv$, wherein Ar represents an arylene radical such as a phenylene radical, or a substituted phenylene radical such as an alkyl-, alkoxy-, carboxyl-, and the like substituted phenylene radical; and ($a$) is an integer having a value of from 0 to about 8 or higher, and preferably from 0 to about 4.

The silicon-containing azoic dyestuffs of this invention contain units which can be represented by the general formula:

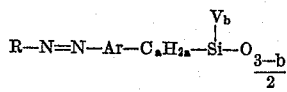

wherein Ar and ($a$) have the same meanings as hereinbefore indicated; V represents an alkyl radical such as methyl, ethyl, propyl and the like; ($b$) is an integer having a value of from 0 to 2; and R is the residue of an ice color coupling component.

It has now been found that aminoarylalkoxysilanes represented by the general formula:

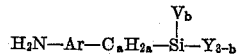

wherein Ar, V, ($a$) and ($b$) have the same meanings as hereinbefore indicated; and Y represents an alkoxy radical such as methoxy, ethoxy, propoxy, and the like, or an aryloxy radical such as phenoxy; are suitable diazo components and can be diazotized and coupled with ice color coupling components to produce a new series of silicon-containing azoic dyestuffs, which have never before been produced. Such dyestuffs can be used to dye glass fibers, natural fibers such as wool, silk and cotton, and synthetic fibers such as nylon, acetate, viscose, Dynel, Acrilan, and the like, from an aqueous dyebath. The hydrophilic natural fibers are also made water repellent by these dyestuffs.

The aminoarylalkoxysilanes which can be used as starting diazo components are the subject matter of our copending patent application, Serial No. 655,506, filed April 29, 1957. Illustrative of the aminoaryl-alkoxysilanes which can be used are:

1-amino-4-methyldiethoxysilylbenzene,
1-amino-3-methyl-4-(beta-triethoxyethylsilyl)-benzene,
1-amino-4-(beta-triethoxysilylethyl)-benzene,
1-amino-4-triethoxysilylbenzene,
1-amino-2-methyl-4-(beta-triethoxysilylpropyl)-benzene,
1-amino-3-(beta-triethoxysilylethyl)-4-methoxybenzene,
1-amino-4-(beta-dimethylethoxysilylethyl)-benzene,
1-amino-4-(beta-methyldiethoxysilylethyl)-benzene, and the like.

An advantage of this invention is that the aminoaryl-alkoxysilanes can be diazotized by ordinary methods and require no special procedures. They can be used in the various common ways for preparing azoic dyestuffs. For example, they can be coupled with ice color components to give insoluble dyestuffs or pigments; or the dyestuff can be prepared directly on the fiber by padding the ice color coupling component on the fabric and developing the dyestuff on the fibers. The reverse procedure can also be used, that is padding the diazonium salt of the aminoaryl-alkoxysilane on the fabric and then treating with the ice color coupling component to develop the dyestuff. The diazo compounds can be stabilized by formation of their diazo-amino or other stable derivatives, and these can then be incorporated into a printing paste, and the color then developed on the fibrous material by acid development by procedures well known in dyestuff technology.

Illustrative of the ice color coupling components which are suitable for use with the diazotized aminoaryl-alkoxysilanes are the following: 2-naphthol, 8-amino-2-naphthol, benzyl naphthols, N-acylated-8-amino-2-naphthols, pyrazolones, hydroxybenzofluorenones; the N-substituted amides such as the arylides of 2-hydroxy-3-naphthoic acid, of 2-hydroxy-3-anthroic acid, of methyl and dimethylsalicyclic acids, of acetoacetic acid, of benzoylacetic acid, or hydroxybenzacridone carboxylic acids, of hydroxybenzothiophene carboxylic acids; and the acetoacetyl derivatives of thiazoles, of carbothiazoles, and the like.

The siloxane azoic dyestuffs of this invention contain the unit represented by the general formula:

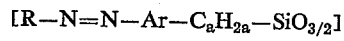

when a trifunctional aminoarylalkoxysilane is used as starting diazo component. When the starting diazo component is a difunctional silane, the dyestuff contains the unit represented by the general formula:

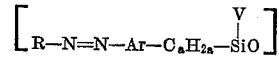

while monofunctional silane diazo components yield disiloxanes which can be represented by the general formula:

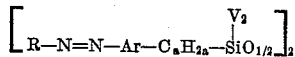

In a typical example, a solution of beta-(aminophenyl)-ethyltriethoxysilane in 3 ml. of water and 3 ml. of 20° Bé. hydrochloric acid was prepared. This was cooled to 5° C. and diazotized in the usual manner with a solution of 0.38 g. of sodium nitrite in 5 ml. of water. A cotton fabric, previously impregnated with 2-naphthol and oven dried, was immersed in the prepared diazonium salt solution at about 5° C. A brilliant red color immediately formed on the fabric. The cloth was washed with warm water, soaped, rinsed, and air dried. The dyestuff was insoluble and had good light stability and wash fastness properties. The same dyestuff was produced on the fabric by initial immersion of the cloth in the diazonium salt solution, and then immersing the impregnated and squeezed cloth in a dilute alkaline 2-naphthol solution.

What is claimed is:

1. A method of dyeing fibrous material, which comprises impregnating said fibrous material with an ice color coupling component and then contacting said impregnated material with a diazonium salt of an aminoarylalkoxysilane represented by the formula:

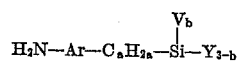

wherein Ar represents a member selected from the group consisting of arylene radicals and substituted arylene radicals; V represents a member selected from the group consisting of alkyl radicals; Y represents a member selected from the group consisting of alkoxy and aryloxy radicals; (a) is an integer having a value of 0 to about 8; and (b) is an integer having a value of from 0 to 2; rinsing, and drying.

2. A method of dyeing fibrous material, which comprises impregnating said fibrous material with a diazonium salt of an aminoarylalkoxysilane represented by the formula:

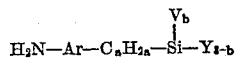

wherein Ar represents a member selected from the group consisting of arylene radicals and substituted arylene radicals; V represents a member selected from the group consisting of alkyl radicals; Y represents a member selected from the group consisting of alkoxy and aryloxy radicals; (a) is an integer having a value of 0 to about 8; and (b) is an integer having a value of from 0 to 2; and then contacting said impregnated material with an ice color coupling component, rinsing, and drying.

References Cited in the file of this patent

UNITED STATES PATENTS

| | | |
|---|---|---|
| 2,317,965 | Bestian | Apr. 27, 1943 |
| 2,649,353 | Streck | Aug. 18, 1953 |
| 2,751,133 | Speier | Aug. 9, 1955 |
| 2,778,746 | Steinman | Jan. 22, 1957 |
| 2,832,754 | Jex | Apr. 29, 1958 |
| 2,849,333 | Kingsburg | Aug. 26, 1958 |